US012579311B2

(12) United States Patent
Rodriguez Bravo et al.

(10) Patent No.: US 12,579,311 B2
(45) Date of Patent: Mar. 17, 2026

(54) IDENTIFY AND OBFUSCATE SENSITIVE DATA BEFORE INGESTING TO GENERATIVE AI ENGINES

(71) Applicant: Kyndryl, Inc., New York, NY (US)

(72) Inventors: Cesar Augusto Rodriguez Bravo, Alajuela (CR); Ilyas Iyoob, Pflugerville, TX (US); Venkatapurna Parthasarathy Madhira, Frisco, TX (US); C. Steven Kurlowecz, Carlisle, MA (US)

(73) Assignee: Kyndryl, Inc., New York, NY (US)

( * ) Notice: Subject to any disclaimer, the term of this patent is extended or adjusted under 35 U.S.C. 154(b) by 155 days.

(21) Appl. No.: 18/438,073

(22) Filed: Feb. 9, 2024

(65) Prior Publication Data
US 2025/0258960 A1      Aug. 14, 2025

(51) Int. Cl.
*G06F 21/62*          (2013.01)
(52) U.S. Cl.
CPC ................................. *G06F 21/6254* (2013.01)
(58) Field of Classification Search
CPC .............................. G06F 21/62; G06F 21/6254
See application file for complete search history.

(56) References Cited

U.S. PATENT DOCUMENTS

| | | | | |
|---|---|---|---|---|
| 9,317,501 | B2 * | 4/2016 | Kraenzel | ................. G06F 40/58 |
| 12,073,930 | B1 * | 8/2024 | Alperin | .................. G06N 20/10 |
| 2021/0004485 | A1 * | 1/2021 | Summers | .............. G06F 40/284 |

| | | | | |
|---|---|---|---|---|
| 2021/0294918 | A1 * | 9/2021 | Pasupuleti | .............. G10L 15/16 |
| 2022/0092468 | A1 * | 3/2022 | Mukherjee | .............. G06F 21/85 |
| 2022/0335159 | A1 * | 10/2022 | Hahn | .................. G06F 21/6281 |
| 2023/0161972 | A1 | 5/2023 | Härmä | |
| 2023/0229790 | A1 | 7/2023 | Mozer | |
| 2023/0259787 | A1 | 8/2023 | David | |
| 2024/0419912 | A1 * | 12/2024 | Somech | ................. G06N 3/044 |
| 2025/0068764 | A1 * | 2/2025 | Joshi | ........................ G06F 40/20 |
| 2025/0077708 | A1 * | 3/2025 | Boynton | ............. G06F 21/6245 |
| 2025/0094611 | A1 * | 3/2025 | Bell | ..................... G06F 21/6245 |
| 2025/0110976 | A1 * | 4/2025 | Channapattan | ....... G06F 40/205 |
| 2025/0112768 | A1 * | 4/2025 | Ho | ........................ G06F 21/602 |

(Continued)

OTHER PUBLICATIONS

Kan, Z., Qiao, L., Yu, H., Peng, L., Gao, Y., & Li, D. (2023). Protecting user privacy in remote conversational systems: A privacy-preserving framework based on text sanitization. arXiv preprint arXiv:2306.08223. (Year: 2023).*

(Continued)

*Primary Examiner* — Philip J Chea
*Assistant Examiner* — Dorianne Alvarado David
(74) *Attorney, Agent, or Firm* — CANTOR COLBURN LLP; Erik Swanson

(57)          ABSTRACT

An approach is provided that identifies a sensitive data in a request to an artificial intelligence (AI) engine. In one embodiment, the identifying further includes: translating the request from one natural language to other natural languages, thus creating translated requests, comparing fields in the first natural language to fields in the other natural languages with the comparing resulting in some untranslated fields that are treated as the sensitive data. The approach further includes creating an obfuscated request by obfuscating the sensitive data identified in the request before the obfuscated request is transmitted to the AI engine.

17 Claims, 8 Drawing Sheets

(56) References Cited

U.S. PATENT DOCUMENTS

| | | | | |
|---|---|---|---|---|
| 2025/0165648 A1 * | 5/2025 | Gomez | .............. | G06F 21/6254 |
| 2025/0225277 A1 * | 7/2025 | Morris | ............... | G06F 21/6254 |
| 2025/0245332 A1 * | 7/2025 | Cappel | ................... | G06F 21/57 |

OTHER PUBLICATIONS

"GenAI Content Filtering: How to Prevent Exposure of Sensitive Data," Nightfall, 2021, 7 pages.

Lyu et al., "New Trends in Machine Translation using Large Language Models: Case Examples with ChatGPT," Computation and Language, arxiv.org arXiv:2305.01181v1;2/5/203, May 2023, 8 pages.

Sebastian, "Privacy and Data Protection in ChatGPT and Other AI Chatbots: Strategies for Securing User Information," Georgia Institute of Technology, International Journal of Security and Privacy in Pervasive Computing 15 (1), May 2023, 17 pages.

Mejibovski, "Secure your companies sensitive data in a new era of Chat GPT," Surf Security Inc., 2023, 8 pages.

* cited by examiner

100

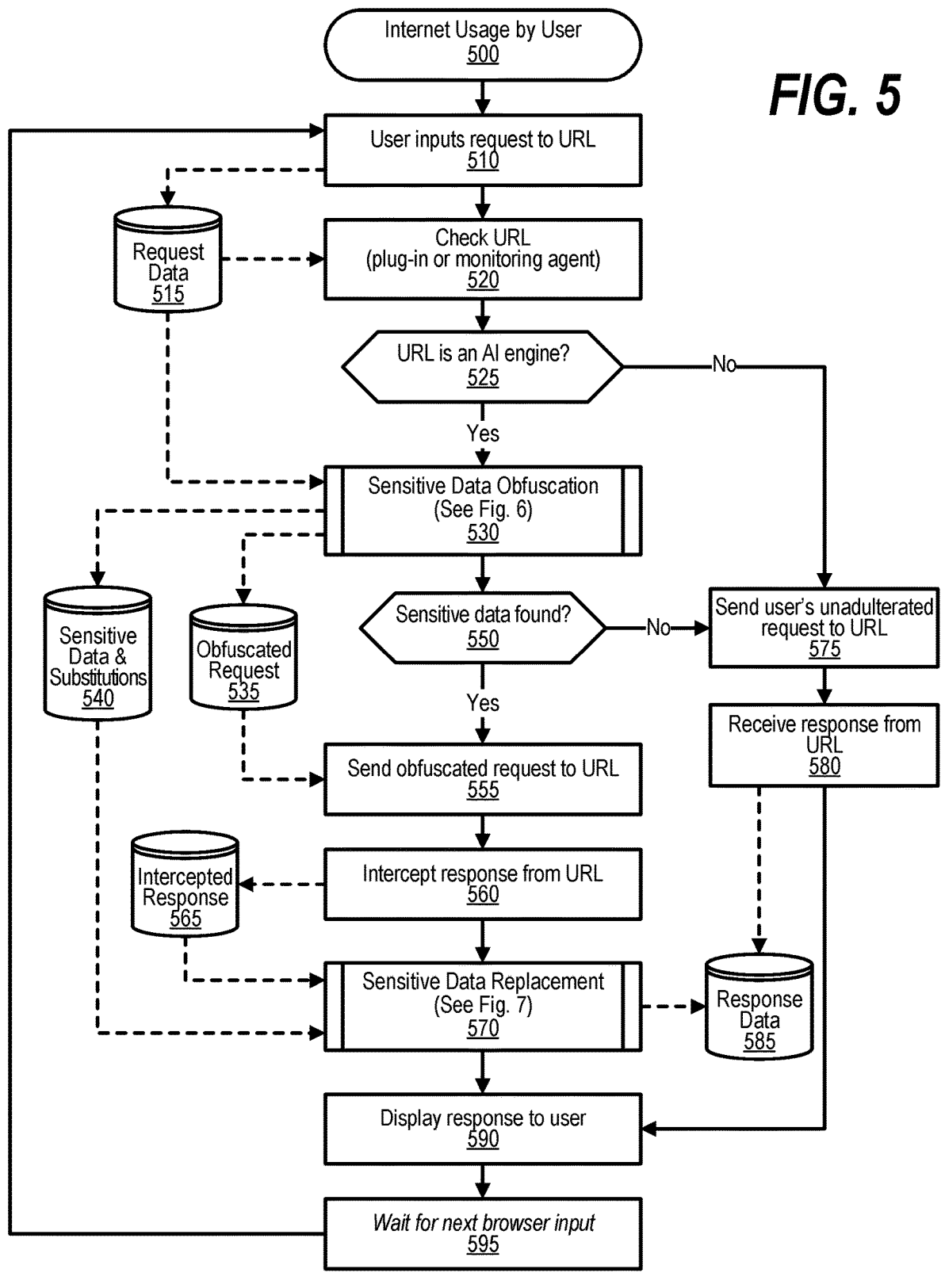

FIG. 5

Internet Usage by User
500

User inputs request to URL
510

Request Data
515

Check URL
(plug-in or monitoring agent)
520

URL is an AI engine?
525

No

Yes

Sensitive Data Obfuscation
(See Fig. 6)
530

Sensitive Data & Substitutions
540

Obfuscated Request
535

Sensitive data found?
550

No

Send user's unadulterated request to URL
575

Yes

Receive response from URL
580

Send obfuscated request to URL
555

Intercepted Response
565

Intercept response from URL
560

Sensitive Data Replacement
(See Fig. 7)
570

Response Data
585

Display response to user
590

Wait for next browser input
595

IDENTIFY AND OBFUSCATE SENSITIVE DATA BEFORE INGESTING TO GENERATIVE AI ENGINES

BACKGROUND

Large Language Models (LLMs) such as GPT (Generative Pre-trained Transformer) represent a significant advancement in the field of artificial intelligence, specifically within natural language processing (NLP). These models are trained on extensive corpora of text data, allowing them to generate coherent, contextually relevant text based on the input they receive. The training process involves the adjustment of millions, or even billions, of parameters, which enables the model to predict the next word in a sequence with remarkable accuracy. This pre-training is followed by a fine-tuning stage, where the model is further trained on a more specific dataset to enhance its performance on particular tasks. The architecture of LLMs facilitates the handling of long-range dependencies in text, making these models exceptionally proficient in a wide range of NLP tasks, including but not limited to text completion, translation, summarization, and question-answering.

The ingestion of data provided by users to LLMs is a critical aspect of their operation, allowing these models to interact dynamically with users and generate tailored responses. When a user inputs text, the LLM processes this input, contextualizing it within its pre-trained knowledge base to generate a response. This interaction does not imply a learning process from the individual inputs; instead, the model leverages its pre-trained parameters to infer the most probable continuation based on the given context. Because of their user inputs, LLMs can retain sensitive user data that is included in conversation history while the user interacts with the Generative AI engines that are built upon the LLM.

SUMMARY

An approach is provided that identifies a sensitive data in a request to an artificial intelligence (AI) engine. In one embodiment, the identifying further includes: translating the request from one natural language to other natural languages, thus creating translated requests, comparing fields in the first natural language to fields in the other natural languages with the comparing resulting in some untranslated fields that are treated as the sensitive data. The approach further includes creating an obfuscated request by obfuscating the sensitive data identified in the request before the obfuscated request is transmitted to the AI engine.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein:

FIG. 5 is a flowchart depicting steps taken to identify and obfuscate sensitive data before it is ingested by a generative AI engine;

DETAILED DESCRIPTION

Figure 1:
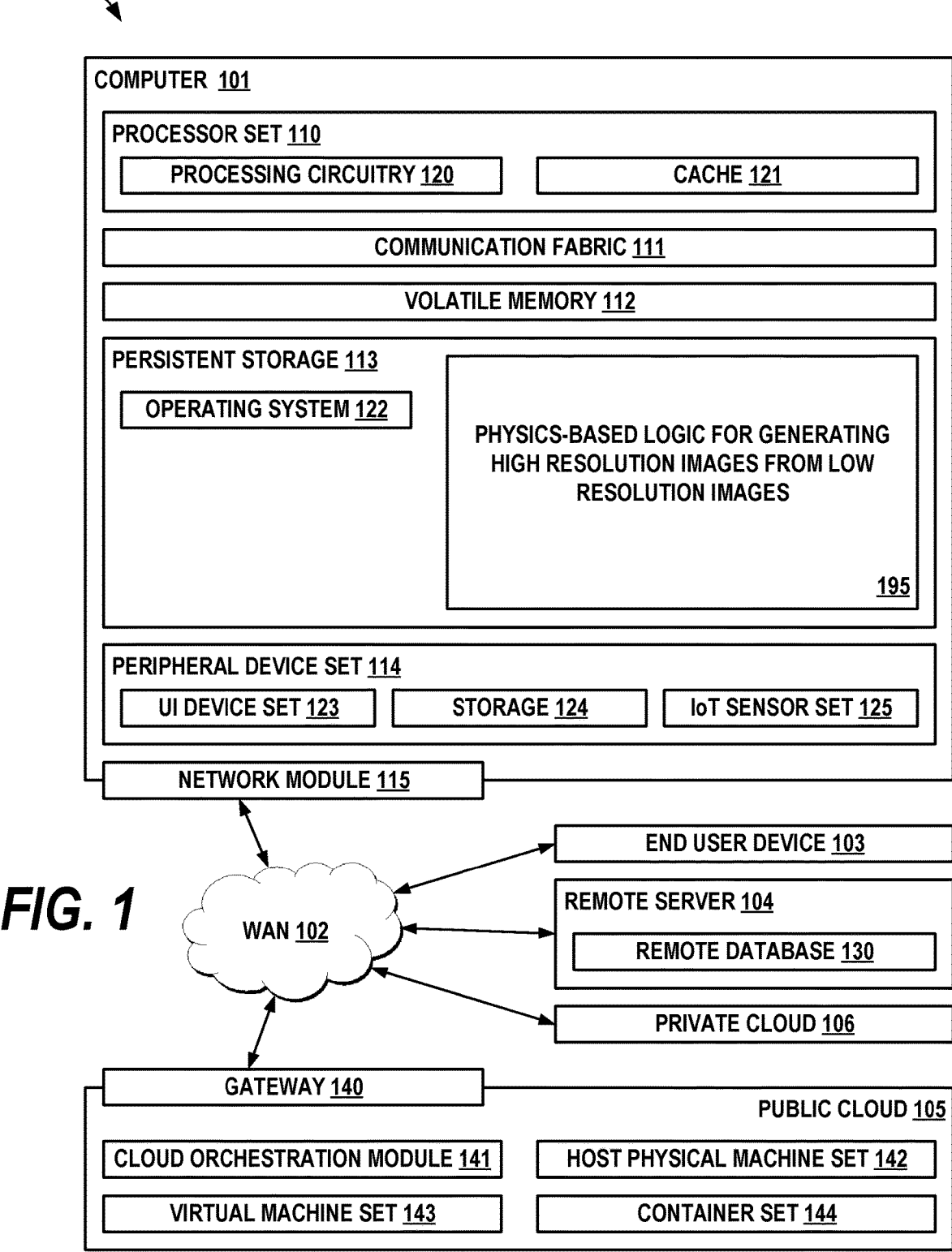
FIG. 1 is a block diagram of a data processing system in which the methods described herein can be implemented.

The disclosed approach pertains to a process executed by a processor in conjunction with a memory, primarily focused on enhancing privacy and security in interactions with an artificial intelligence (AI) engine. The core of the approach involves the identification of sensitive data within a request directed towards an AI engine, followed by the creation of an obfuscated request through the concealment of the identified sensitive data, and the subsequent transmission of this altered request to the AI engine.

An extension of the primary approach encompasses a specific obfuscation technique where the sensitive data within the request is replaced by a non-sensitive token. This aspect of the approach also includes the reception of a response from the AI engine and the replacement of any non-sensitive tokens within this response with the originally obfuscated sensitive data, thereby restoring the sensitive information for the end user's comprehension.

Another variation of the approach involves the outright deletion of sensitive data from the request as a means of obfuscation, presenting a more straightforward approach to data privacy.

Further, the approach accounts for requests containing multiple sensitive data fields, each corresponding to various types of sensitive information. An automated obfuscation process is applied to at least one sensitive data field, determined by its specific type of sensitive data.

In a more interactive embodiment, the approach enables the display of a sensitive data field to the user, contingent on the field's type. The user is then prompted to provide replacement text for this field, which is used to replace the sensitive data in the obfuscated request, thereby involving the user directly in the obfuscation process.

Alternatively, the approach allows for the presentation of a sensitive data field to the user with the option to either replace the sensitive data with user-provided text or to retain the original sensitive data unchanged in the obfuscated request, offering flexibility in how sensitive information is handled.

A sophisticated approach to identifying sensitive data involves translating the request from its original language to one or more different languages. This translation process generates several versions of the request, which are then compared to identify fields that remain untranslated. These untranslated fields are presumed to be sensitive data, leveraging linguistic differences as a means of sensitive data detection.

Overall, the approach described herein describes a comprehensive system for managing sensitive data in requests to AI engines, employing various strategies for data obfuscation and user engagement, thereby ensuring the privacy and security of sensitive information in AI interactions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
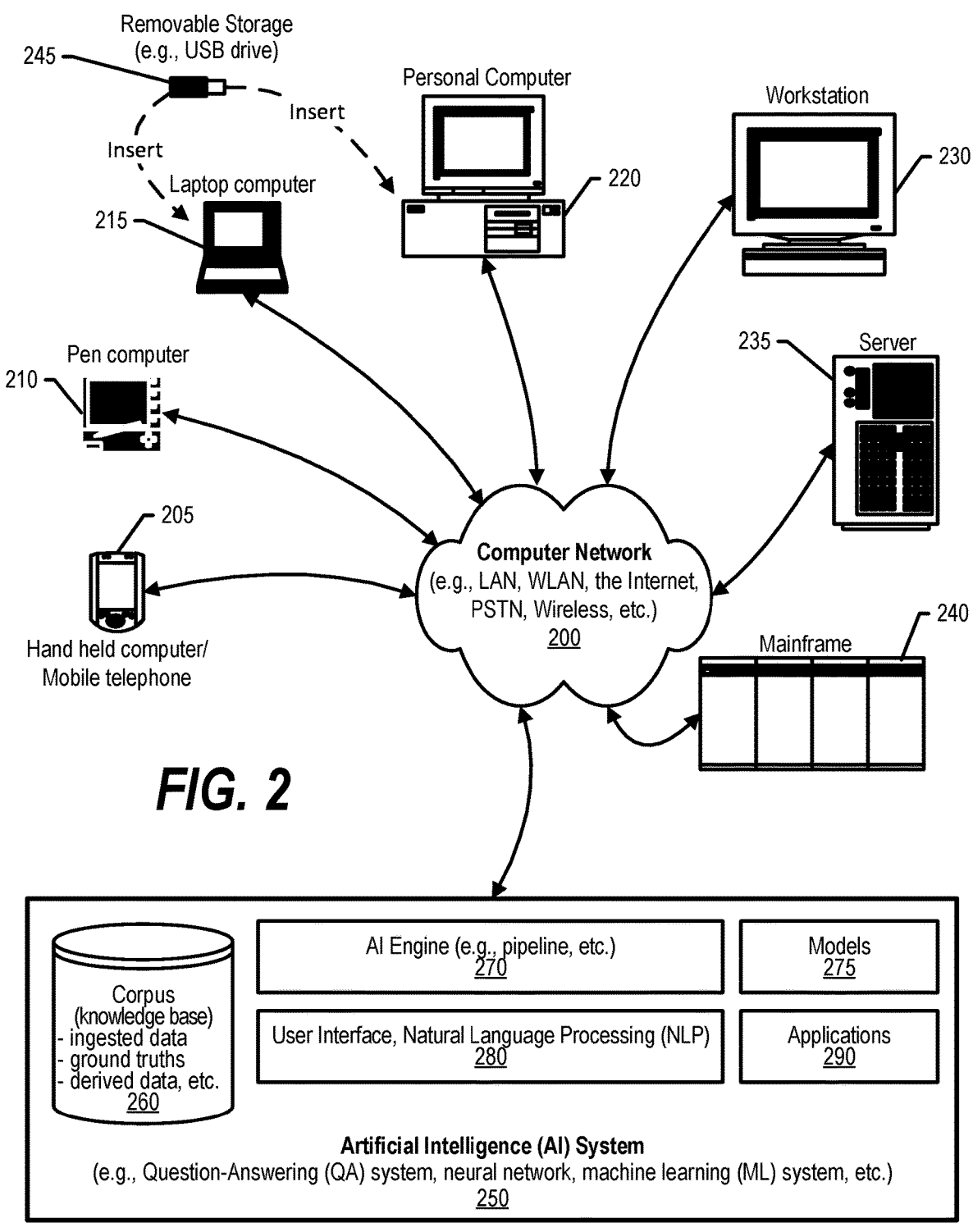
FIG. 2 provides an extension of the information handling system environment shown in FIG. 1 to illustrate that the methods described herein can be performed on a wide variety of information handling systems which operate in a networked environment.

FIG. 1 is a block diagram of a data processing system in which the methods described herein can be implemented. Computing environment 100 contains an example of an environment for the execution of at least some of the computer code involved in performing the inventive methods, such as shown in the description of block 195. In addition to block 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 195, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 195 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in block 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A NETWORKED ENVIRONMENT is shown in FIG. 2. The networked environment provides an extension of the information handling system shown in FIG. 1 illustrating that the methods described herein can be performed on a wide variety of information handling systems that operate in a networked environment, depicted by computer network 200. Types of computer networks can include local area networks (LANs), wide area networks (WANs), the Internet, peer-to-peer networks, public switched telephone networks (PSTNs), wireless networks, etc. Types of information handling systems range from small handheld devices, such as handheld computer/mobile telephone 205 to large mainframe systems, such as mainframe computer 240. Examples of handheld computer 205 include smart phones, personal digital assistants (PDAs), personal entertainment devices, such as MP3 players, portable televisions, and compact disc players. Other examples of information handling systems include pen, or tablet, computer 210, laptop, or notebook, computer 215, personal computer 220, workstation 230, and server computer system 235. Other types of information handling systems that are not individually shown in FIG. 2 can also be interconnected other computer systems via computer network 200.

Many of the information handling systems include non-volatile data stores, such as hard drives and/or nonvolatile memory depicted in FIG. 1. These nonvolatile data stores and/or memory can be included, or integrated, with a particular computer system or can be an external storage device, such as an external hard drive. In addition, removable nonvolatile storage device 245 can be shared among two or more information handling systems using various techniques, such as connecting the removable nonvolatile storage device 245 to a USB port or other connector of the information handling systems.

An ARTIFICIAL INTELLIGENCE (AI) SYSTEM is depicted at the bottom of FIG. 2. Artificial intelligence (AI) system 250 is shown connected to computer network 200 so that it is accessible by other computer systems 205 through 240. AI system 250 runs on one or more information handling systems (comprising one or more processors and one or more memories, and potentially any other computing device elements generally known in the art including buses, storage devices, communication interfaces, and the like) that connects AI system 250 to computer network 200. The network 200 may include multiple computing devices 104 in communication with each other and with other devices or components via one or more wired and/or wireless data communication links, where each communication link may comprise one or more of wires, routers, switches, transmitters, receivers, or the like. AI system 250 and network 200 may enable functionality, such as question/answer (QA) generation functionality, for one or more content users. Other embodiments of AI system 250 may be used with components, systems, sub-systems, and/or devices other than those that are depicted herein.

AI system 250 maintains corpus 260, also known as a "knowledge base," which is a store of information or data that the AI system draws on to solve problems. This knowledge base includes underlying sets of facts, ground truths, assumptions, models, derived data, and rules which the AI system has available in order to solve problems. In one embodiment, a content creator creates content in corpus 260. This content may include any file, text, article, or source of data for use in AI system 250. Content users may access AI system 250 via a network connection or an Internet connection to the network 200, and, in one embodiment, may input questions to AI system 250 that may be answered by the content in the corpus of data. As further described below, when a process evaluates a given section of a document for semantic content, the process can use a variety of conventions to query it from the AI system.

AI system 250 may be configured to receive inputs from various sources. For example, AI system 250 may receive input from the network 200, a corpus of electronic documents or other data, a content creator, content users, and other possible sources of input. In one embodiment, some or all of the inputs to AI system 250 may be routed through the network 200. The various computing devices on the network 200 may include access points for content creators and content users. Some of the computing devices may include devices for a database storing the corpus of data. The network 200 may include local network connections and remote connections in various embodiments, such that AI system 250 may operate in environments of any size, including local and global, e.g., the Internet. Additionally, AI system 250 serves as a front-end system that can make available a variety of knowledge extracted from or represented in documents, network-accessible sources and/or structured data sources. In this manner, some processes populate the AI system with the AI system also including input interfaces to receive knowledge requests and respond accordingly.

AI Engine 270, such as a pipeline, is an interconnected and streamlined collection of operations. The information works its way into and through a machine learning system, from data collection to training models. During data collection, such as data ingestion, data is transported from multiple sources, such as sources found on the Internet, into a centralized database stored in corpus 260. The AI system can then access, analyze, and use the data stored in its corpus.

Models 275 are the result of AI modeling. AI modeling is the creation, training, and deployment of machine learning algorithms that emulate logical decision-making based on the data available in the corpus with the system sometimes utilizing additional data found outside the corpus. AI models 275 provide AI system 250 with the foundation to support advanced intelligence methodologies, such as real-time analytics, predictive analytics, and augmented analytics.

User interface 280, such as Natural Language (NL) Processing (NLP) is the interface provided between AI system 200 and human uses. Semantic content is content based on the relation between signifiers, such as words, phrases, signs, and symbols, and what they stand for, their denotation, or connotation. In other words, semantic content is content that interprets an expression, such as by using NLP. Semantic data is stored as part of corpus 260. In one embodiment, the process sends well-formed questions (e.g., natural language questions, etc.) to the AI system. AI system 250 may interpret the question and provide a response to the content user containing one or more answers to the question. In some embodiments, AI system 250 may provide a response to users in a ranked list of answers. Other types of user interfaces (UIs) can also be used with AI system 250, such as a command line interface, a menu-driven interface, a Graphical User Interface (GUI), a Touchscreen Graphical User Interface (Touchscreen GUI), and the like.

AI applications 290 are various types of AI-centric applications focused on one or more tasks, operations, or environments. Examples of different types of AI applications include search engines, recommendation systems, virtual assistants, language translators, facial recognition and image labeling systems, and question-answering (QA) systems.

In some illustrative embodiments, AI system 250 may be a question/answering (QA) system, which is augmented with the mechanisms of the illustrative embodiments described hereafter. A QA type of AI system 250 may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the I QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Figure 3:
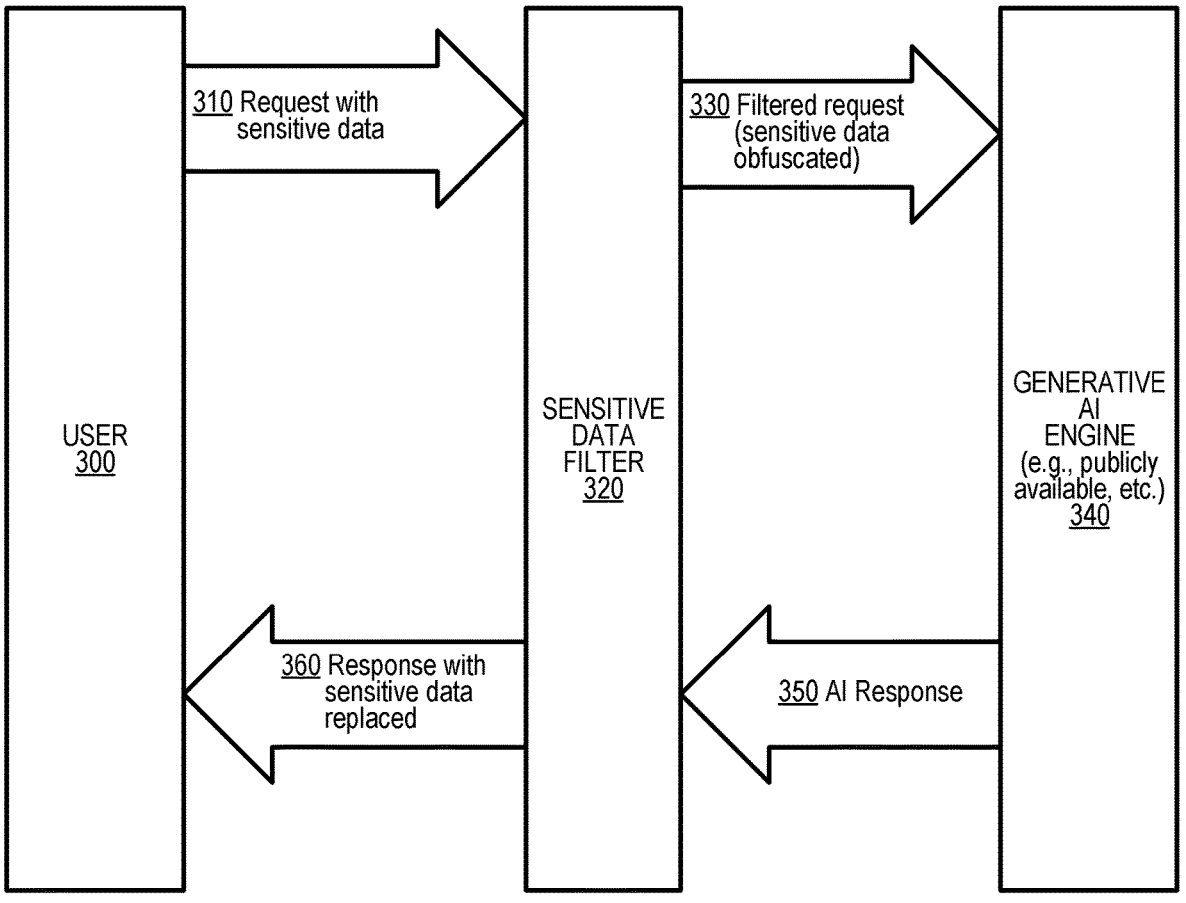
FIG. 3 is a component diagram depicting the components used to identify and obfuscate sensitive data before it is ingested by a generative AI engine.

A component diagram is shown in FIG. 3 that illustrates the mechanisms employed to detect and anonymize sensitive information prior to its processing by a generative artificial intelligence (AI) engine. This diagram outlines the workflow initiated by User 300, who transmits a request through data flow 310. This request may contain sensitive information and is directed towards a Generative AI Engine, identified as AI Engine 340, which could be accessible to the general public. Before the request reaches AI Engine 340, it is intercepted by the Sensitive Data Filter process, labeled as process 320. This process is designed to identify sensitive data within the request and replace it with anonymized data, effectively concealing the original content of the request from the AI Engine. For instance, a real individual's name such as "Robert Williams" could be replaced with a generic placeholder like "John Doe," and a genuine social security number could be substituted with a dummy number such as '999-99-9999'. Following this anonymization, the altered request is forwarded to AI Engine 340 via data flow 330, with the sensitive information suitably obfuscated.

Subsequently, the AI Engine processes the obfuscated request and generates a response. This response, devoid of any sensitive data owing to the initial obfuscation, is sent back through data flow 350. Upon receipt, the Sensitive Data Filter process 320 intervenes once more, this time to revert the anonymized data back to its original sensitive form. This involves the restoration of placeholder data with the actual sensitive information, such as substituting "John Doe" back to "Robert Williams" and the dummy social security number '999-99-9999' to Mr. Williams's real social security number. The response, now containing the reinstated sensitive data, is conveyed to User 300 through data flow 360.

Figure 4:
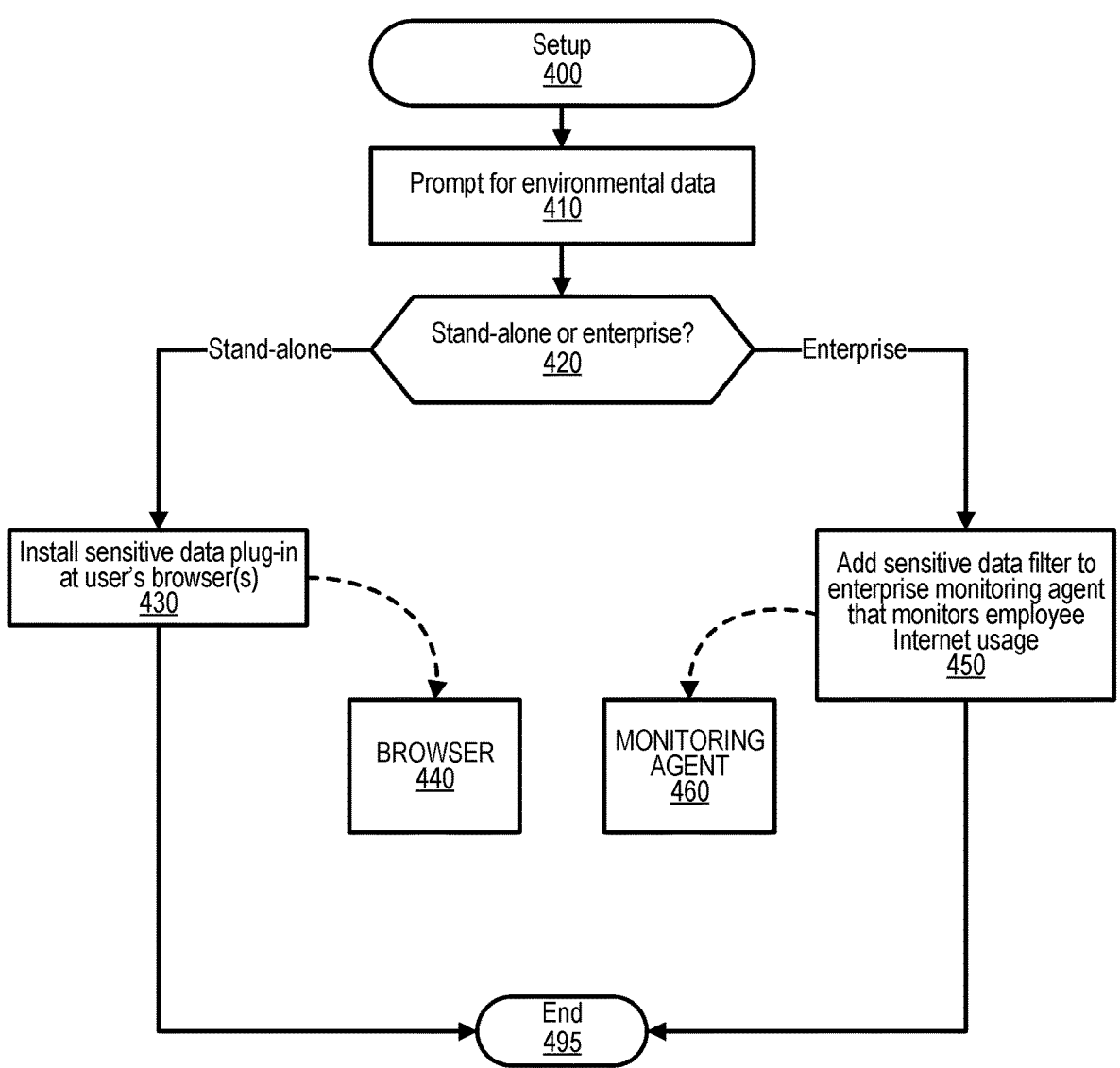
FIG. 4 is a flowchart depicting steps taken to set up the system based on the user's environment.

FIG. 4, is a flowchart outlining the procedural steps required to configure a system in alignment with the specificities of the user's operational environment. The commencement of the setup process is marked at point 400, delineating the initiation of the procedural sequence. The initial step, designated as step 410, involves the system querying the user for pertinent environmental data to ascertain the nature of the intended installation, distinguishing between a stand-alone installation and an enterprise installation.

Following the acquisition of the requisite environmental data, the process progresses to a decision-making phase at decision point 420, where it evaluates the type of installation based on the user's input. In the event that a stand-alone installation is determined to be the appropriate course of action, decision 420 directs the process along the 'stand-alone' pathway, culminating at step 430. At this juncture, the system undertakes the installation of the sensitive data plug-in directly within the user's browser(s), indicated as element 440. This plug-in is specifically engineered to facilitate the identification and obfuscation of sensitive information during the user's browser-based activities.

Conversely, should the decision at point 420 favor an enterprise installation, the process diverges onto the 'enterprise' pathway, leading to step 450. In this scenario, the system's action involves the integration of the sensitive data filter within an enterprise monitoring agent, denoted as element 460. This agent is tasked with overseeing and regulating internet usage across the enterprise, ensuring the protection and confidentiality of sensitive data amidst employee online interactions. The culmination of the setup process is signified at step 495, marking the conclusion of setup activities.

FIG. 5 is a flowchart that explicates the procedural steps implemented for the identification and obfuscation of sensitive data prior to its assimilation by a generative artificial intelligence (AI) engine. The flowchart commences at point 500, introducing the sequence of operations executed by a monitoring process that scrutinizes a user's internet activities, particularly when directing requests to an AI engine.

The initial phase, marked at step 510, involves the reception of user inputs, specifically requests aimed at a Uniform Resource Locator (URL). These requests are subsequently stored within a data store, identified as element 515. Progressing to step 520, the process employs either a browser plug-in or a monitoring agent to verify the URL against a predefined repository of URLs associated with AI engines. This verification leads to a pivotal decision point at 525, where the process ascertains whether the examined URL is affiliated with an AI engine.

Upon affirmation that the URL is linked to an AI engine (the 'yes' branch of decision 525), the procedure advances to steps 530 and 550. At the predefined process 530, the Sensitive Data Obfuscation routine is executed (further details are provided in FIG. 6 and its accompanying narrative). This routine entails the obfuscation of sensitive data, with both the original and substituted data being cataloged in data store 540, while the modified request data is archived in data store 535.

The process then evaluates the presence of sensitive data within the AI engine-bound request at decision point 550. If sensitive data is detected (the 'yes' branch of decision 550), the process progresses through steps 555 to 570. In this pathway, the obfuscated request from data store 535 is transmitted to the AI engine's URL at step 555. The response from the AI engine is intercepted at step 560, with the captured response data being stored in data store 565. Subsequently, at predefined process 570, the Sensitive Data Replacement routine is executed (further elucidation is provided in FIG. 7 and its respective text), which modifies the intercepted response data (now in data store 565) to produce the final response data stored in data store 585.

Conversely, if the URL is not associated with an AI engine or if no sensitive data is identified (the 'no' branches of decisions 525 and 550 respectively), the process redirects to step 575, where the user's original request is dispatched unmodified to the URL. The response from the URL is then received at step 580 and stored in data store 585.

The flowchart concludes with steps 590 and 595, where the process displays the response data from data store 585 to the user and awaits subsequent browser input, respectively. Upon receipt of new input, the process cycles back to step 510 to recommence the described procedures, thus ensuring continuous monitoring and protection of sensitive data during user interactions with AI engines.

Figure 6:
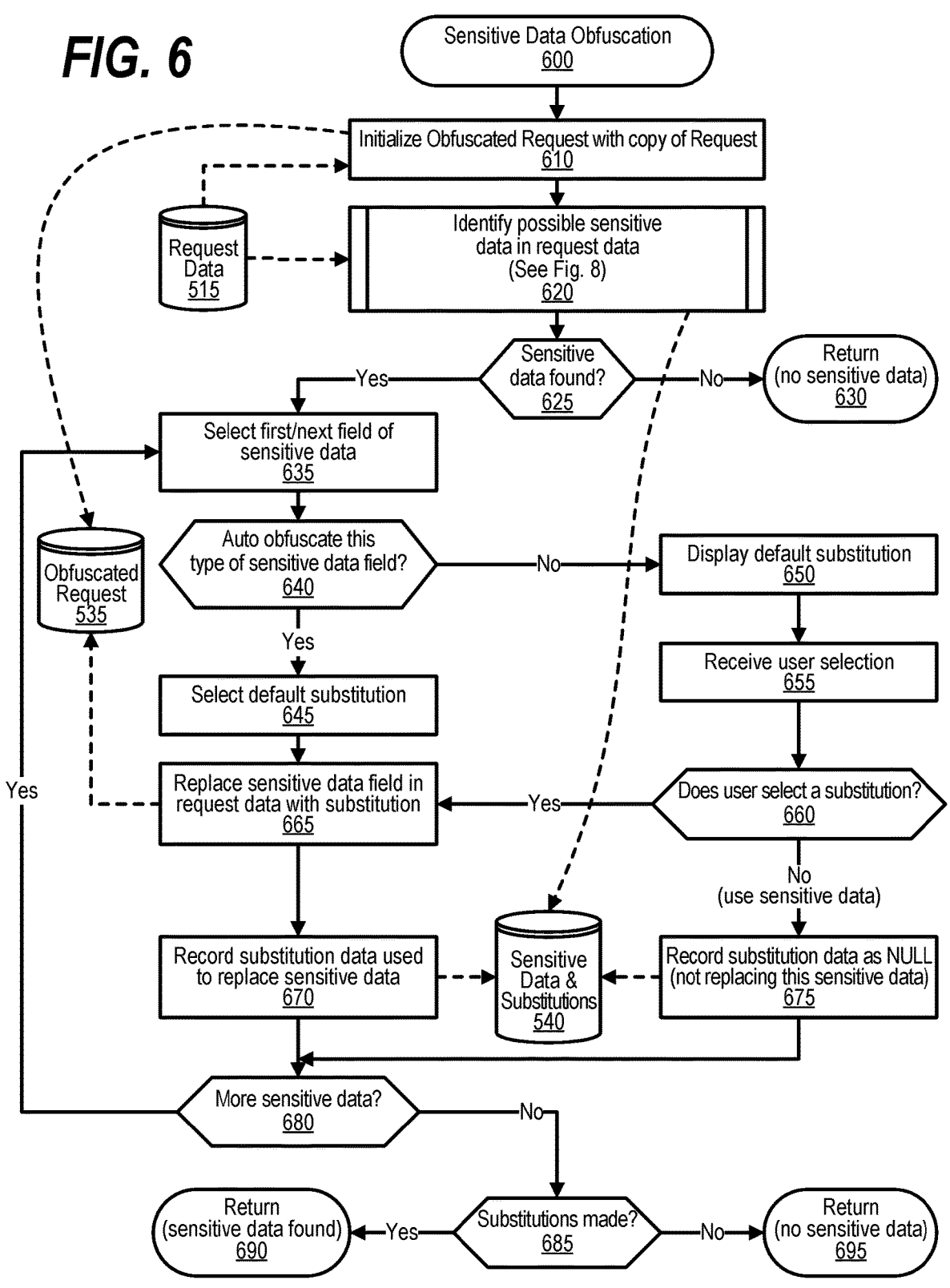
FIG. 6 is a flowchart depicting steps taken by a sensitive data obfuscation subprocess.

FIG. 6 is a flowchart that outlines the sensitive data obfuscation subprocess. This subprocess is initiated at step 600, where the framework for sensitive data obfuscation is established. At the outset, step 610 involves initializing the obfuscated request by duplicating the request data from data store 515 into an initialized obfuscated request data, which is subsequently stored in data store 535.

A critical component of this subprocess is the Identify Possible Sensitive Data in Request Data routine, encapsulated in predefined process 620. The details of this routine are further elaborated in FIG. 8 and its accompanying text. Following this routine, the process arrives at a decisive juncture at decision 625, where it assesses whether sensitive data has been identified within the request data.

In scenarios where sensitive data is detected (the 'yes' branch of decision 625), the process progresses through steps 635 to 695 to address the identified sensitive data. The initial action at step 635 involves selecting the first field of sensitive data from data store 540. The subsequent step, decision 640, evaluates whether this particular type of sensitive data field is subject to automatic obfuscation. If affirmative, the process proceeds along the 'yes' branch to step 645, where a default substitution is automatically assigned to replace the sensitive data field. An illustrative example provided is the automatic obfuscation of Social Security numbers with a default placeholder, such as '999-99-9999'.

Conversely, if the sensitive data field is not subject to automatic obfuscation (the 'no' branch of decision 640), steps 650 through 660 are enacted. These steps involve presenting a default substitution to the user at step 650 and soliciting the user's preference at step 655, where the user may opt for either the substitution or the retention of the actual sensitive data. This decision is critical, as in some instances, the actual sensitive data may be pivotal to the request being directed to the AI engine.

The process then revisits decision 660 to ascertain whether the user has opted for a substitution. If a substitution is chosen (the 'yes' branch of decision 660), the sensitive data field within the request data is replaced with the selected substitution text at step 665, with this modification being recorded in obfuscated request data store 535. Subsequently, at step 670, the substitution data employed is documented in data store 540.

If the user elects to retain the sensitive data (the 'no' branch of decision 660), step 675 records the substitution data as NULL, indicating the preservation of the sensitive data within the obfuscated request data stored in data store 535.

Following the processing of a sensitive data field, decision 680 assesses the necessity to process additional sensitive data fields from data store 540. Should more fields require processing (the 'yes' branch of decision 680), the process cycles back to step 635 to continue the sensitive data field processing. This iterative cycle persists until all sensitive data fields have been addressed, culminating in the 'no' branch of decision 680, which signifies the end of the loop.

The subprocess concludes with decision 685, which evaluates whether any substitutions were executed within the request data. If substitutions were made (the 'yes' branch of decision 685), the process returns to the requesting routine (as detailed in FIG. 5) with a return code indicating that sensitive data was identified and obfuscated. In contrast, if no substitutions were effected (the 'no' branch of decision 685), the process similarly returns to the requesting routine (referenced in FIG. 5) with a return code denoting that no sensitive data was obfuscated within the request data. This detailed exposition encapsulates the sensitive data obfuscation subprocess as outlined in FIG. 6 and reference [0048], highlighting the intricate steps involved in safeguarding sensitive data within the context of AI engine interactions.

Figure 7:
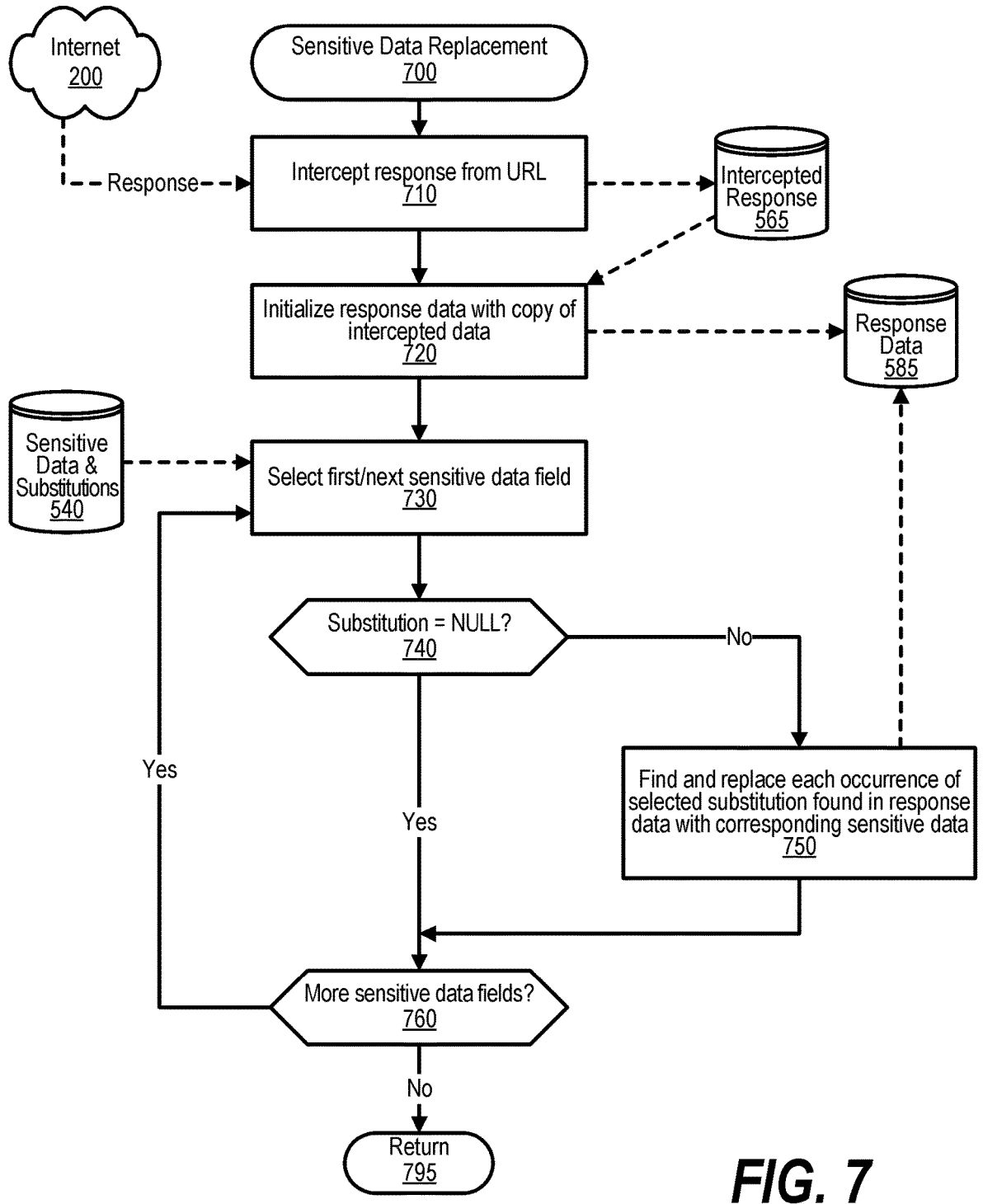
FIG. 7 is a flowchart depicting steps taken by a sensitive data replacement process.

FIG. 7 is a flowchart for a sensitive data replacement process. This process is designed to reverse the obfuscation of sensitive data in the responses received from an artificial intelligence (AI) engine, ensuring that the original sensitive information is restored before it is presented to the user. The process begins at step 700, signifying the initiation of the sensitive data replacement operations.

The first action, outlined at step 710, involves the interception of the AI engine's response, which is directed to the URL from which the user's obfuscated request was originally sent. The intercepted response is subsequently stored within data store 565 for further processing. Progressing to step 720, the process involves initializing the response data with a duplicate of the intercepted data from data store 565, thereby preparing it for the sensitive data replacement procedure.

At step 730, the process selects the initial sensitive data field from data store 540, which catalogues both the sensitive data and its corresponding substitutions. Following this selection, the process reaches a critical decision point at decision 740, where it determines whether the substitution for the selected sensitive data field is marked as 'NULL'. A 'NULL' substitution indicates that no obfuscation was applied to this particular piece of sensitive data. If the substitution is 'NULL', the process bypasses step 750 and proceeds directly, indicating that no replacement is required for this field.

Conversely, if the substitution is not 'NULL', which implies that a corresponding substitution text exists, the process advances to step 750. At this juncture, the process undertakes the task of locating and replacing each instance of the substitution within the response data with the original sensitive data. For instance, if the sensitive data pertains to an individual's name, such as "Robert Anderson", and the substitution used was an alternate name like "John Doe", the process would replace every occurrence of "John Doe" in the response data with "Robert Anderson".

The next decision point, decision 760, assesses whether additional sensitive data fields within data store 540 require processing. If further sensitive data fields are present and necessitate processing, the process loops back to step 730, selecting and processing the subsequent sensitive data field from data store 540 in accordance with the described methodology. This loop persists until all sensitive data fields have been addressed, at which point decision 760 directs the process to exit the loop.

The sensitive data replacement process concludes at step 795, where it returns control to the calling routine, as referenced in FIG. 5. This return signifies the completion of the sensitive data replacement, ensuring that the response data, now restored with the original sensitive information, is ready to be displayed to the user.

Figure 8:
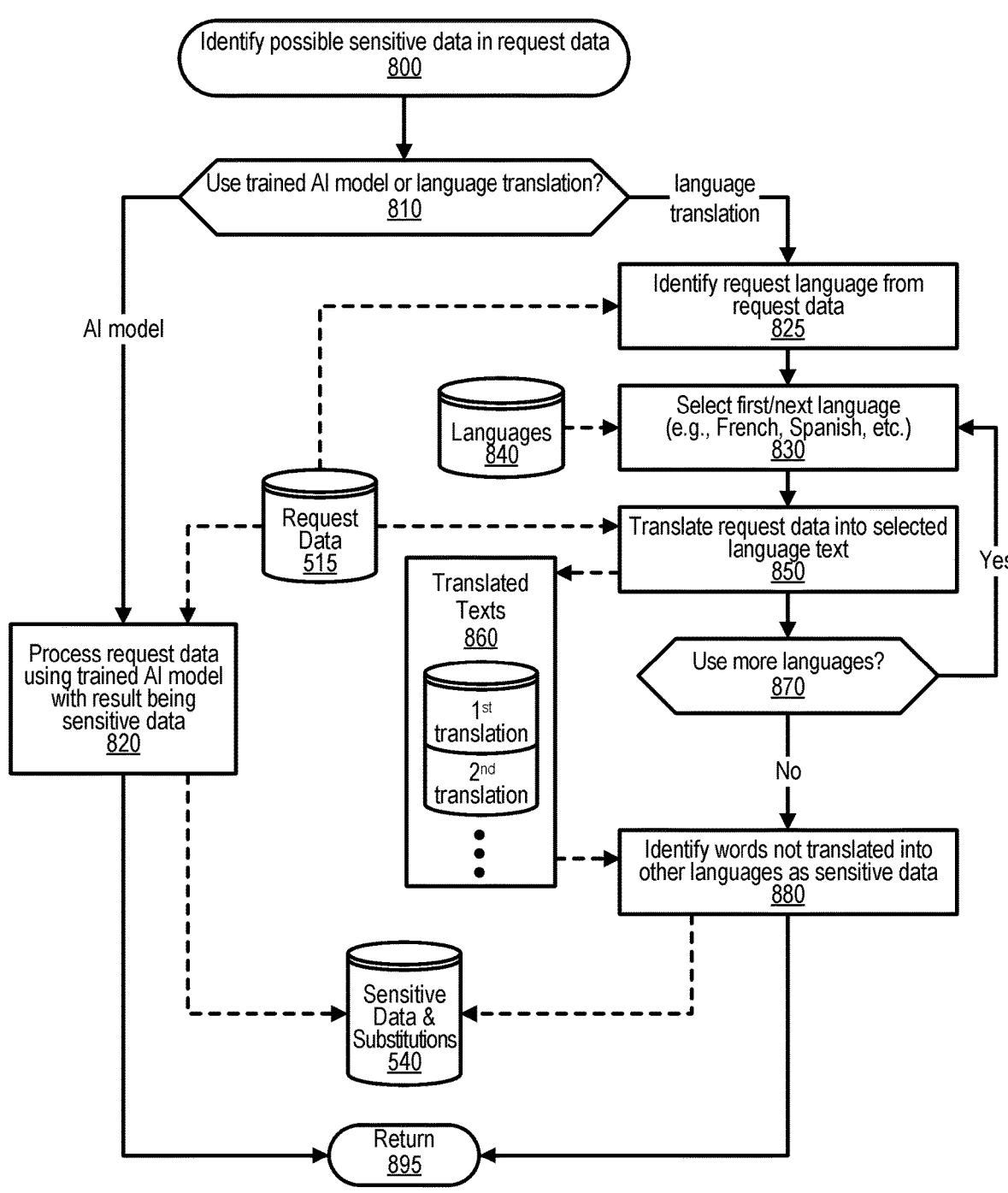
FIG. 8 is a flowchart depicting steps taken by a process that identifies possible sensitive data in a user's request.

FIG. 8 is a flowchart outlining the methodology employed by a process designed to identify potential sensitive data within a user's request. The process initiates at step 800, setting the stage for the subsequent identification of sensitive data within the user's request data.

A decision is made at decision 810 regarding the methodological approach for detecting sensitive data: the process evaluates whether to deploy a trained AI Model engine, if available, or to resort to a language translation strategy. If the choice falls on utilizing a trained AI Model engine, decision 810 directs the process towards the ' AI Model' branch, leading to step 820. Here, the request data, retrieved from data store 515, undergoes analysis by the chosen trained AI model. The outcome of this analysis, constituting identified sensitive data, is subsequently archived in data store 540.

Conversely, should the decision at 810 lean towards employing a language translation mechanism, the process veers towards the 'language translation' branch, encompassing steps 825 through 880. This segment of the process is activated when the language translation method is selected for the detection of sensitive data. Commencing at step 825, the process ascertains the language of the request from the request data housed in data store 515. Progressing to step 830, the process selects an initial natural language from an assortment of languages stored within data store 840.

At step 850, a translation of the request data from the user's language into the chosen natural language is executed. The translated text is then stored within translated texts data stores 860. This step is crucial as it allows for the comparison of text across different languages, helping to identify language-specific sensitive data.

The process subsequently evaluates the need for additional language translations at decision 870, considering the possibility that common words in different languages might mistakenly be flagged as sensitive data. If further translations are deemed necessary ('yes' branch of decision 870), the process loops back to step 830 to select and translate into the next natural language. This iterative process continues until all relevant languages have been utilized for translation, at which point decision 870 transitions to the 'no' branch, concluding the loop.

In the final step, 880, the process identifies text that remains untranslated across the various languages as potential sensitive data. Such data may encompass personal names, geographical locations, organizational identifiers, or other unique identifiers. The sensitive data thus identified is stored in data store 540, ensuring its segregation for subsequent processing.

Upon completion of the sensitive data identification process, the workflow concludes and returns to the calling routine, as indicated in FIG. 6, at step 895. This return marks the end of the sensitive data identification phase, as detailed in FIG. 8.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an": the same holds true for the use in the claims of definite articles.

What is claimed is:

1. A method, implemented by a processor coupled to a memory, comprising:

identifying a sensitive data in a request to an artificial intelligence (AI) engine by translating the request from a first natural language to one or more second natural languages and treating one or more untranslated fields as the sensitive data;

creating an obfuscated request by obfuscating the sensitive data identified in the request;

obfuscating the request by replacing the sensitive data with a non-sensitive token;

transmitting the obfuscated request to the AI engine;

receiving a response from the AI engine; and replacing one or more non-sensitive tokens found in the response with the sensitive data.

2. The method of claim 1 further comprising:

obfuscating the request by deleting the sensitive data from the request.

3. The method of claim 1 further comprising:

identifying that the sensitive data includes a plurality of sensitive data fields, wherein the sensitive data fields correspond to a plurality of sensitive data types; and automatically obfuscating a first sensitive data field based on the first sensitive data field's corresponding sensitive data type.

4. The method of claim 3 further comprising:

displaying a second sensitive data field to a user based on the second sensitive data field's corresponding sensitive data type;

prompting a replacement text from the user; and receiving the replacement text from the user, wherein the replacement text replaces the second sensitive data field in the obfuscated request.

5. The method of claim 3 further comprising:

displaying a second sensitive data field to a user based on the second sensitive data field's corresponding sensitive data type;

prompting a replacement text from the user; and receiving a response from the user to leave the sensitive data type unchanged in the obfuscated request.

6. An information handling system comprising:

one or more processors;

a memory coupled to at least one of the processors; and a set of instructions stored in the memory and executed by at least one of the processors to perform actions comprising:

identifying a sensitive data in a request to an artificial intelligence (AI) engine by translating the request from a first natural language to one or more second natural languages and treating one or more untranslated fields as the sensitive data;

creating an obfuscated request by obfuscating the sensitive data identified in the request;

obfuscating the request by replacing the sensitive data with a non-sensitive token;

transmitting the obfuscated request to the AI engine;

receiving a response from the AI engine; and replacing one or more non-sensitive tokens found in the response with the sensitive data.

7. The information handling system of claim 6 wherein the actions further comprise:

obfuscating the request by deleting the sensitive data from the request.

8. The information handling system of claim 6 wherein the actions further comprise:

identifying that the sensitive data includes a plurality of sensitive data fields, wherein the sensitive data fields correspond to a plurality of sensitive data types; and automatically obfuscating a first sensitive data field based on the first sensitive data field's corresponding sensitive data type.

9. The information handling system of claim 8 wherein the actions further comprise:

displaying a second sensitive data field to a user based on the second sensitive data field's corresponding sensitive data type;

prompting a replacement text from the user; and receiving the replacement text from the user, wherein the replacement text replaces the second sensitive data field in the obfuscated request.

10. The information handling system of claim 8 wherein the actions further comprise:

displaying a second sensitive data field to a user based on the second sensitive data field's corresponding sensitive data type;

prompting a replacement text from the user; and receiving a response from the user to leave the sensitive data type unchanged in the obfuscated request.

11. A computer program product comprising:

a computer readable storage medium comprising a set of computer instructions that, when executed by a processor, are effective to perform actions comprising:

identifying a sensitive data in a request to an artificial intelligence (AI) engine, wherein the identifying the sensitive data further comprises: translating the request from a first natural language to one or more second natural languages, the translating creating one or more translated requests; comparing a first plurality of fields in the first natural language to a second plurality of fields in the second natural languages, the comparing resulting in one or more untranslated fields; and treating the untranslated fields as the sensitive data;

creating an obfuscated request by obfuscating the sensitive data identified in the request;

obfuscating the request by replacing the sensitive data with a non-sensitive token;

transmitting the obfuscated request to the AI engine;

receiving a response from the AI engine; and replacing one or more non-sensitive tokens found in the response with the sensitive data.

12. The computer program product of claim 11 wherein the actions further comprise:

obfuscating the request by deleting the sensitive data from the request.

13. The computer program product of claim 11 wherein the actions further comprise:

identifying that the sensitive data includes a plurality of sensitive data fields, wherein the sensitive data fields correspond to a plurality of sensitive data types; and automatically obfuscating a first sensitive data field based on the first sensitive data field's corresponding sensitive data type.

14. The computer program product of claim 13 wherein the actions further comprise:

displaying a second sensitive data field to a user based on the second sensitive data field's corresponding sensitive data type;

prompting a replacement text from the user; and receiving the replacement text from the user, wherein the replacement text replaces the second sensitive data field in the obfuscated request.

15. The computer program product of claim 13 wherein the actions further comprise:

displaying a second sensitive data field to a user based on the second sensitive data field's corresponding sensitive data type;

prompting a replacement text from the user; and

receiving a response from the user to leave the sensitive data type unchanged in the obfuscated request.

16. A method, implemented by a processor coupled to a memory, comprising:

identifying a sensitive data in a request to an artificial intelligence (AI) engine, the identifying further comprising:

translating the request from a first natural language to one or more second natural languages, the translating creating one or more translated requests;

comparing a first plurality of fields in the first natural language to a second plurality of fields in the second natural languages, the comparing resulting in one or more untranslated fields; and treating the untranslated fields as the sensitive data;

creating an obfuscated request by obfuscating the sensitive data identified in the request;

obfuscating the request by replacing the sensitive data with a non-sensitive token;

transmitting the obfuscated request to the AI engine;

receiving a response from the AI engine; and replacing one or more non-sensitive tokens found in the response with the sensitive data.

17. An information handling system comprising:

one or more processors;

a memory coupled to at least one of the processors; and a set of instructions stored in the memory and executed by at least one of the processors to perform actions comprising:

translating a request from a first natural language to one or more second natural languages, the translating creating one or more translated requests;

comparing a first plurality of fields in the first natural language to a second plurality of fields in the second natural languages, the comparing resulting in one or more untranslated fields; and treating the untranslated fields as sensitive data;

creating an obfuscated request by obfuscating the sensitive data identified in the request;

obfuscating the request by replacing the sensitive data with a non-sensitive token;

transmitting the obfuscated request to an AI engine;

receiving a response from the AI engine; and replacing one or more non-sensitive tokens found in the response with the sensitive data.

* * * * *